United States Patent [19]

Rezanka

[11] Patent Number: 4,658,269

[45] Date of Patent: Apr. 14, 1987

[54] INK JET PRINTER WITH INTEGRAL ELECTROHYDRODYNAMIC ELECTRODES AND NOZZLE PLATE

[75] Inventor: Ivan Rezanka, Pittsford, N.Y.

[73] Assignee: Xerox Corporation, Stamford, Conn.

[21] Appl. No.: 869,647

[22] Filed: Jun. 2, 1986

[51] Int. Cl.[4] ........................ G01D 15/16; H01S 4/00; C23F 1/00

[52] U.S. Cl. .................................. 346/75; 29/157 C; 29/592 R; 29/825; 29/846; 156/150; 156/625; 156/644; 156/661.1; 204/9; 204/11; 204/14.1; 346/140 R; 427/58; 427/402; 430/311; 430/318

[58] Field of Search ............................ 346/75, 140 R; 29/157 C, 592 R, 825, 846; 156/150, 625, 644, 661.1; 204/9, 11, 14.1; 427/58, 402; 430/311, 318

[56] References Cited

U.S. PATENT DOCUMENTS

| | | | |
|---|---|---|---|
| 3,596,275 | 7/1971 | Sweet | 346/1 |
| 3,878,519 | 4/1975 | Eaton | 346/1 |
| 3,949,410 | 4/1976 | Bassous et al. | 346/75 |
| 4,047,184 | 9/1977 | Bassous et al. | 346/75 |
| 4,220,958 | 9/1980 | Crowley | 346/75 |
| 4,343,013 | 8/1982 | Bader et al. | 346/140 R |
| 4,550,062 | 11/1985 | You | 239/690 |
| 4,560,991 | 12/1985 | Schutrum | 346/75 |
| 4,568,946 | 2/1986 | Weinberg | 346/75 |

*Primary Examiner*—E. A. Goldberg
*Assistant Examiner*—Gerald E. Preston
*Attorney, Agent, or Firm*—Robert A. Chittum

[57] ABSTRACT

An electrohydrodynamic stimulated ink jet printing device and method of manufacture which eliminates the prior art problem of ink wetting the dielectric spacer between the stimulating electrode and the ink jet nozzles. The nozzles are electroformed on one side of a sheet of dielectric material and the EHD electrodes are electroformed on the other side of the dielectric material in registration with the nozzles. The dielectric material is removed from the nozzles by using the nozzles or the electrodes as masks. The internal surface of the dielectric material is coated with a one of a number of coatings non-wettable by the ink such as a mixture of paraffin and ethylene vinyl acetate copolymer dissolved in a light aliphatic hydrocarbon, such as VMP naphtha.

12 Claims, 3 Drawing Figures

INK JET PRINTER WITH INTEGRAL ELECTROHYDRODYNAMIC ELECTRODES AND NOZZLE PLATE

BACKGROUND OF THE INVENTION

1. Field of the Invention

This invention relates to continuous stream type ink jet printers, and more particularly, to such printers having a printhead with integral electrohydrodynamic electrodes and nozzle plate.

2. Description of the Prior Art

Ink jet devices of the continuous stream type generally employ a printhead having a droplet generator with multiple nozzles from which continuous streams of ink droplets are emitted and directed to a recording medium or a collecting gutter. The ink is stimulated prior to or during its exiting from the nozzles so that the stream breaks up into a series of uniform droplets at a fixed distance from the nozzles. As the droplets are formed, they are selectively charged by the application of a charging voltage by electrodes positioned adjacent the streams at the location where they break up into droplets. The droplets which are charged are deflected by an electric field either into a gutter for ink collection and reuse, or to a specific location on the recording medium, such as paper, which may be continuously transported at a relatively high speed across the paths of the droplets.

Printing information is transferred to the droplets through charging by the electrodes, the charging control voltages are applied to the charging electrodes at the same frequency as that which the droplets are generated. This permits each droplet to be individually charged so that it may be positioned at a distinct location different from all other droplets or sent to the gutter. Printing information cannot be transferred to the droplets properly unless each charging electrode is activated in phase with the droplet formation at the associated ink stream. As the droplets proceed in flight towards the recording medium, they are passed through an electric field which deflects each individually charged droplet in accordance with its charge magnitude to specific pixel locations on the recording medium.

A common method of perturbating an array of continuous ink jets is by a piezoelectric driver. The driver produces acoustic waves which traverse an ink reservoir to the nozzles, perturbating the jets and ideally causing uniform breakup of the jets in terms of break-off length and phase. Thus, the drop generator reservoir or manifold has two functions, to distribute ink to the individual nozzles and to distribute acoustic energy to the individual jets to cause a controlled uniform breakup into droplets.

In practice, there are a number of difficulties associated with this approach, most of them related to the manifold or reservoir. Since the reservoir is an acoustic pathway to the jets, it must be acoustically designed. This means the materials used should be acoustically matched to the ink and the fabrication must be of high precision. The completed drop generator must have a piezoelectric driver accurately positioned in a precision reservoir which also must have a precise array of nozzles. The droplet generators successfully meeting the design criteria tend to be quite bulky and heavy, costly to fabricate, and when used in a carriage type configuration, place a stressing burden on the carriage mechanism.

To eliminate the problems associated with printheads having acoustic reservoirs that distribute acoustic energy from the piezoelectric driver to the individual streams of ink emitted from the nozzles, electrohydrodynamic electrodes may be positioned at the printhead nozzles or orifices, or certain forms of thermal energy pulses may be used to perturbate the streams and cause the uniform breakup of the streams at fixed distances from the nozzles.

U.S. Pat. No. 3,878,519 to Eaton discloses the selective application of heat energy to the ink stream emitted under pressure from a nozzle to reduce the surface tension of successive segments of the ink stream before the ink stream would randomly break up into droplets. Both the quantity of energy applied and the duration of the applied energy, control the breakup point of the stream at predetermined distances from the nozzle. The source of heat may be high intensity light converted to heat energy by the ink stream, or by an annular or partially annular resistive heater positioned with the nozzle and at the nozzle orifice outer surface.

U.S. Pat. No. 3,596,275 to Sweet discloses the basic concept of an EHD exciter. The disclosed electrohydrodynamic (EHD) device requires very high voltages and expensive transformers to obtain them. The high voltages represent an electrical complexity, high cost, and safety hazard. The high voltages needed to excite or pulsate the fluid column also interferes with the subsequent droplet charging step.

U.S. Pat. No. 3,949,410 to Bassous et al discloses an EHD exciter integrated into a nozzle. In connection with FIG. 4, they describe the fundamental EHD process first articulated by Sweet in his above-mentioned patent. Bassous et al report the periodic swelling and non-swelling of a fluid column due to the electric field associated with the geometry at the nozzle orifice. They further disclose the fluid mechanics principle that the wavelength of the swelling (i.e. droplet separation) is given by the velocity of the fluid divided by the frequency of the swelling or perturbations.

U.S. Pat. No. 4,220,958 to Crowley discloses a continuous stream-type ink jet printer wherein the perturbation is accomplished by electrohydrodynamic excitation. The EHD exciter is composed of one or more pump electrodes of a length equal to about one-half the droplet spacing. The multiple pump electrode embodiments are spaced at intervals of multiples of about one-half the droplet spacing or wavelength downstream from the nozzles.

U.S. Pat. No, 4,047,184 to Bassous et al discloses a charging electrode array for use in continuous stream type ink jet printers that is formed by anisotropic etching of apertures through a silicon substrate. Conductive diffusion layers in the walls of the apertures permit charges to be placed on the drops at the point of break-off from the ink streams as they pass through the apertures. In one embodiment, the printer nozzles emitting the ink streams are combined with the charging electrodes.

U.S. Pat. No. 4,343,013 to Bader et al discloses a nozzle plate for an ink jet printhead. The front surface of the nozzle plate and the area around the nozzle orifice is provided with a non-wetting coating or material with respect to the ink comprised of water-repellant metal or plastic. The nozzle plate is glass and the nozzles are produced therein by a photoetching process.

The front side (downstream side) of the nozzle plate is coated with such water-repellent material as chromium, nickel or Teflon. Such a coating prevents deposits of ink at the front surface around the nozzles.

U.S. Pat. No. 4,555,062 to You discloses an ionic surface preparation for the nozzles of ink jet printers. The front of the nozzle plate and the surface of the nozzle are ionically activated so that the surface is able to selectively adsorb some of the anti-wetting compound added to the ink. If the desired anti-wetting compound is anionic, the nozzle surfaces are pretreated with a cation. In the case of a cationic anti-wetting compound, the surfaces are pretreated with anions. The pretreatment method is primarily dependent on the nature of the material used to produce the nozzle. P-type ions such as boron can be implanted if the nozzle surface is silicon dioxide. If the nozzle surface is a metal such as nickel, ions such as chromium can be applied by wet chemistry. A typical long chain anionic non-wetting agent such as FC-143 available from the 3M Company of Minneapolis, Minn. is then dissolved in the ink for subsequent adsorption by the pretreated nozzle surface area.

U.S. Pat. No. 4,560,991 to Schutrum discloses an electroformed charge electrode for a continuous stream-type ink jet printer. The charged electrode structure comprises a dielectric substrate having a plurality of spaced electrodes embedded therein. Electrically conducting circuit leads are embedded into a second surface of the dielectric substrate and connect to the electrodes. The electrodes can thereby be charged by a voltage source.

U.S. Pat. No. 4,568,946 to Weinberg discloses a charge electrode means for sensing a charge on the individual ink droplets passing thereby and providing signals which can be used to control the timing of the charging electrical pulses applied to the charging electrodes. The charge electrode means comprises a pair of electrical insulating members mounted in spaced relation to one another so as to provide a gap between opposed surfaces thereof. Conductive charge electrode layers are provided on these opposed surfaces and are electrically connected.

In EHD stimulation of synchronous ink streams, an electrode is generally placed in the proximity of the stream a short distance downstream from the nozzle. This electrode is biased by a time varying voltage in respect to the ink stream, and hence, it has to be electrically insulated from the ink by, for example, a dielectric spacer. The distance from the beginning of the ink stream as it exits from the nozzle to the EHD electrode is defined by the dielectric spacer. The dielectric spacer has to function as an insulator in a hostile environment, being exposed to ink vapor, ink mist, and ink contamination during startup and shutdown of the ink stream. In prior art EHD stimulated continuous stream ink jet printing, the resistance between the ink stream and the electrode was found to be too low for successful drop generation. Such EHD stimulated ink jet printers often shorted with a long recovery period after startup, and it was found to be time dependent with the streams running during printing operation. The cause of the above-mentioned problem was found to be the ink wetting the dielectric spacer. The spacer surface contained microasperities and these microasperities cause the wetting even if the spacer material was non-wettable by the ink.

SUMMARY OF THE INVENTION

It is an object of this invention to provide an integral EHD electrode and nozzle plate for a multiple nozzle printhead of a continuous stream-type ink jet printer which overcomes the prior art problems of dielectric spacer wetting and costly fabrication methods.

In the present invention, an improved electrohydrodynamically stimulated continuous stream-type ink jet device is disclosed having a printhead with a nozzle plate containing multiple nozzles or orifices therein from which ink streams are emitted. The nozzle plate contains integrally therewith circular electrohydrodynamic (EHD) electrodes that surround the ink streams. A cost effective method of fabricating the integral nozzle plate and EHD electrodes is disclosed wherein the integral nozzle plate comprises a sheet of dielectric material having a predetermined thickness with the nozzle plate on one side and the EHD electrodes on the other side. During fabrication, the dielectric material between the nozzle plate and the EHD electrodes is removed using the EHD electrodes as masks so that cylindrical recesses are formed which bottom against the nozzle plate and are concentric with respective orifices. The recesses have diameters larger than the orifices and the ink streams emitted therefrom. The internal surfaces of the recesses and the dielectric material are coated to eliminate ink wetting thereof.

The foregoing features and other objects will become apparent from a reading of the following specification in connection with the drawings, wherein like parts have the same index numerals.

DESCRIPTION OF THE PREFERRED EMBODIMENT

Figure 1:
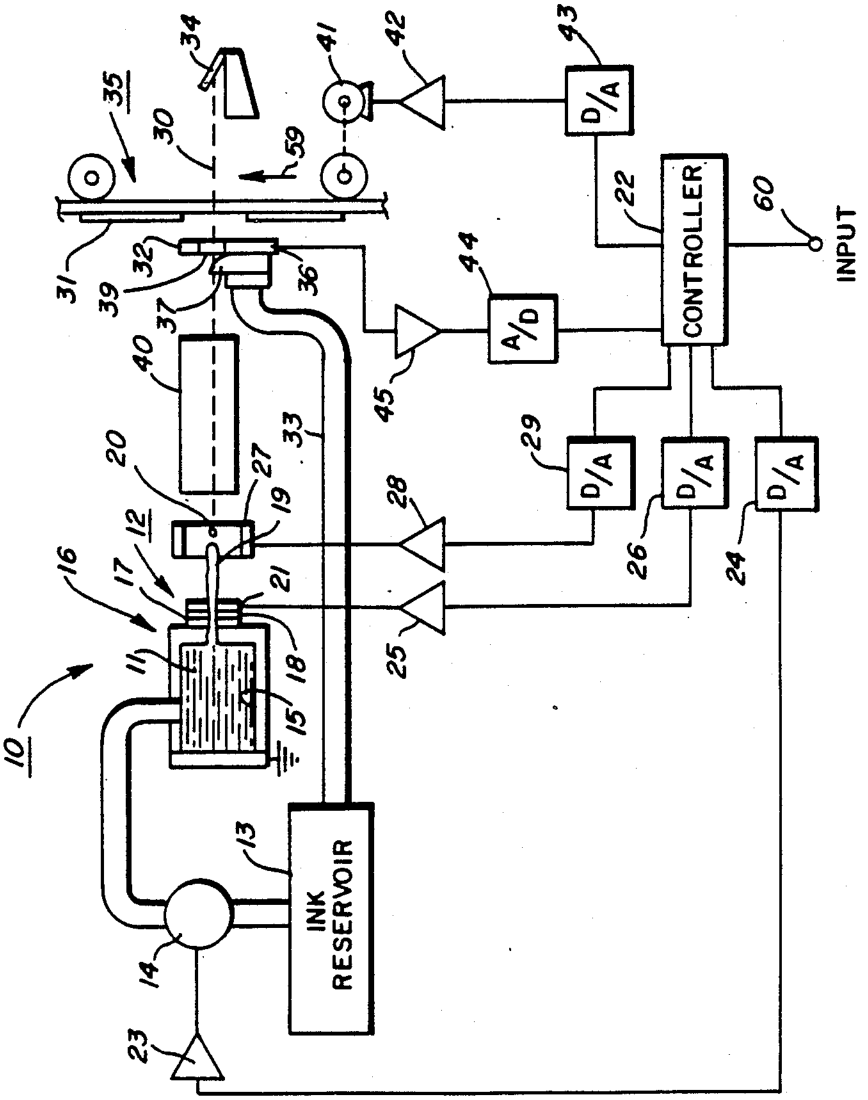
FIG. 1 is an elevational view in schematic form of a continuous stream-type, pagewidth ink jet printer having integral hydrodynamic electrodes and nozzle plate that is the subject matter of the present invention.

Referring to FIG. 1, a continuous stream-type ink jet printer 10 is depicted employing the integral electrohydrodynamic electrodes and nozzle plate 12 of the present invention. Fluid ink 11 is contained in reservoir 13 and is moved by pump 14 into the manifold 15 of the ink droplet generator 16. The droplet generator has an integral nozzle plate 17, dielectric spacer 18, and electrohydrodynamic electrodes 21, referred to hereinafter as the integral nozzle plate assembly 12, with a plurality of nozzles or orifices 38 (better shown in FIGS. 2 and 3), each of which emit a continuous stream of ink 19. Droplets 20 are formed from the stream at a finite distance from the nozzles 38 due to regular electrohydrodynamic stimulation of the synchronous ink jet streams by the electrodes in a manner well known in the prior art. The EHD electrodes are biased by time varying voltage in respect to the ink jet stream and hence they have to be electrically isolated from the ink by a dielectric material or spacer 18. The distance between the EHD electrodes and the nozzle plate is defined as a spacer more fully described later with respect to FIGS. 2 and 3. The pressure of the ink in the manifold 15 is controlled by the pump 14 and establishes the velocity of the droplets 20. The pulsation stimulation introduced by the EHD electrodes 21 is small but is adequate to establish the rate of droplet generation. Both the velocity and droplet frequency are under the control of a microcomputer or controller 22. Droplet velocity is controlled by regulating the pump to appropriately increase or decrease the ink pressure in the manifold 15. The controller communicates with the pump 14 via amplifier 23 and digital-to-analog (D/A) converter 24. The controller communicates with the EHD electrodes by means of amplifier 25 and D/A converter 26.

A charging electrode 27 for each nozzle is located at the position where the droplets 20 are formed from steams 19. The charge electrodes are also under the control of the controller 22. The charge electrodes 27 are coupled to the controller by means of an amplifier 28 and D/A converter 29. The function of the charging electrodes is to impart a negative, positive, or neutral charge to droplets 20. The fluid ink is conductive and is electrically coupled to ground through the manifold 15. When a voltage is applied to the electrode 27 by the controller at the instant of droplet formation, the droplet assumes a charge corresponding to the voltage applied to the electrode. In the embodiment illustrated in FIG. 1, uncharged droplets follow an undeflected flight path 30 to the recording medium 31. Charged droplets are deflected to the left and right of path 30 in a plane perpendicular to the surface of FIG. 1, depending on the sign of the charge. Predetermined values of positive and negative charge for a droplet 20 will cause it to follow a path that directs it into a gutter 37 located to the right or left of centerline paths 30. The ink collected in gutter 37 is returned to the reservoir 13 via conduit 33. Since FIG. 1 is a side view, only one column is seen in that Figure, but it should be understood that a series of nozzles extend along the manifold to generate a series of parallel ink columns.

Droplets which are either uncharged or charged to a level insufficient to cause their trajectory to lead to gutter 37 are directed past a drop sensor 32 to recording medium 31. The drop sensor 32 is used to sense passage of ink droplets towards the recording medium and modify printer operation to insure that ink droplets from the plurality of ink streams are properly positioned on the recording medium. When a stitched system is utilized, as in the preferred embodiment, the drop sensor 32 insures that the ink droplets are properly stitched together to allow each incremental region on the recording medium to be accessed by the droplets from one of the droplet generator nozzles. An example of the use and application of a typical drop sensor 32 is disclosed in U.S. Pat. No. 4,255,754 to Crean et al entitled "Fiber Optic Sensing Method and Apparatus for Ink Jet Recorders", which has been assigned to the assignee of the present invention.

A second gutter 34 for recirculating ink droplets is used to intercept droplets generated while calibrating the system with the aid of the drop sensor 32. One application to which the present invention has particular applicability is a high speed ink jet device wherein successive sheets of recording medium or paper 31 are transmitted past the ink jet printhead and encoded with information. Experience has indicated that it is desirable to recalibrate the printer at periodic intervals to insure that the droplets 20 are directed to desired regions on the recording member 31. To accomplish this calibration, ink droplets are generated and caused to travel past the sensors 32 when no recording member 31 is in position to receive those droplets. In the calibrate mode of operation, it is therefore necessary that a gutter 34 be positioned to intercept droplets which would otherwise strike the recording medium. A transport mechanism 35 is also shown in FIG. 1. The transport 35 is used to move individual sheets of recording medium such as paper 31 past the droplet streams at a controlled rate of speed. Since the present printer is a high speed device, a mechanism must be included in the transport 35 for delivering paper to the transport and for stripping paper away from the transport once it has been encoded by the printer 10. These features of the transport have not been illustrated in FIG. 1, since it is not related to the integral nozzle plate assembly 12 which is the subject of the present invention.

The stitch sensors described in the Crean et al patent referred to above, are mounted on a sensor support board 36. The support board has an aperture 39 that permits the droplets 20 emitted by the nozzles to pass therethrough and either be collected by the gutter 34 during calibration or printed on the recording medium 31. A charged droplet is deflected due to the electrostatic field between deflection electrodes 40 associated with each nozzle. The deflection electrodes 40 have very high voltages coupled to them to create the deflection fields. The potential difference between the voltages is generally in the magnitude of 2,000 to 3,000 volts. The magnitude of the voltage applied to the charging electrode 27 is generally in the range of 10 to 200 volts.

Ink droplet generation, charging, and recording medium transport are all controlled by the controller 22 which interfaces with the various components of the printer 10 by digital-to-analog and analog-to-digital converters. The controller comprises an input 60 for receiving a sequence of digital signals representative of desired voltages to be applied to the charging electrodes 27. The controller then generates multi-bit digital signals representative of desired charging voltages. As stated above, digital-to-analog converter 29 converts the digital signals representative of the desired charging voltage to an analog signal which is coupled to a power amplifier 28, which in turn energizes the charging electrode 27.

In addition to generating the charging voltage for the plurality of charging electrodes 27, the controller 22 receives inputs from the sensor 32 via an analog-to-digital converter 44, controls the speed of movement of the recording medium 31 via a second digital-to-analog converter 43 which drives motor 41, controls perturbation of the ink jet streams by EHD excitation by the electrodes 21 through a third digital-to-analog converter 26, and controls the pressure maintained inside the manifold 15 by pump 14 with a fourth digital-to-analog converter 24. As disclosed in the U.S. Patent to Crean et al, sensor 32 uses a pair of photodetectors to sense ink droplets, one each for two output fibers that are used to generate an electrical zero crossing signal. The zero crossing signal is used to indicate alignment or misalignment of a droplet relative to a bisector of a distance between the two output fibers. The sensor of this patent employs one input optical fiber with each two output optical fibers for each stitch point. The free ends of the fibers are spaced a small distance from each other; the free end of the input fiber is on one side of the flight path of the droplets and the free end of the output fibers are on the opposite side. The remote end of the input fibers is coupled to a light source (not shown), such as an infra-red light emitting diode. The remote ends of each output fiber are coupled to separate photodetectors (not shown), such as for example, a photodiode responsive to infra-red radiation. The ink is substantially transparent to infra-red light, thus reducing the problems of contamination usually associated with ink droplet sensors. The photodiodes are coupled to differential amplifiers (not shown), so that the output of the amplifiers are measurements of the location of droplets relative to the bisector of the distance between the output fiber ends confronting their associated input fibers and droplets passing therebetween. The amplifier outputs are coupled to a comparator 45 which in turn is coupled to the controller 22 via analog-to-digital converter 44 and used in servo loops to position subsequently generated droplets to the bisector location. By using one of the zero-crossing signal detectors at a location between adjacent endmost droplets thrown from separate adjacent nozzles, the stitch point between these nozzles can be controlled so that the segments of each line of droplets to be printed by each nozzle may be adjusted to prevent gaps or overprinting on the recording medium 31.

Figure 3:
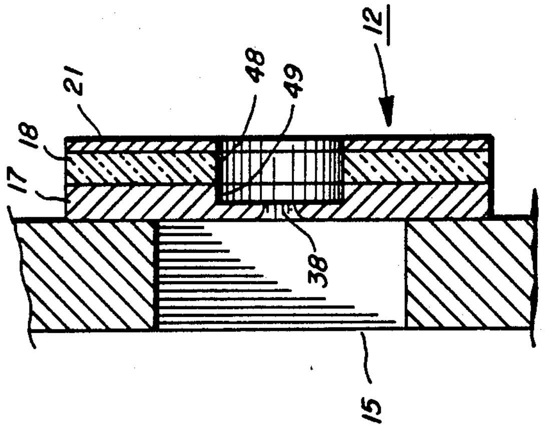
FIG. 3 is a cross-sectional view of the integral nozzle plate and EHD electrodes as viewed along view line 3—3 of FIG. 2.
Figure 2:
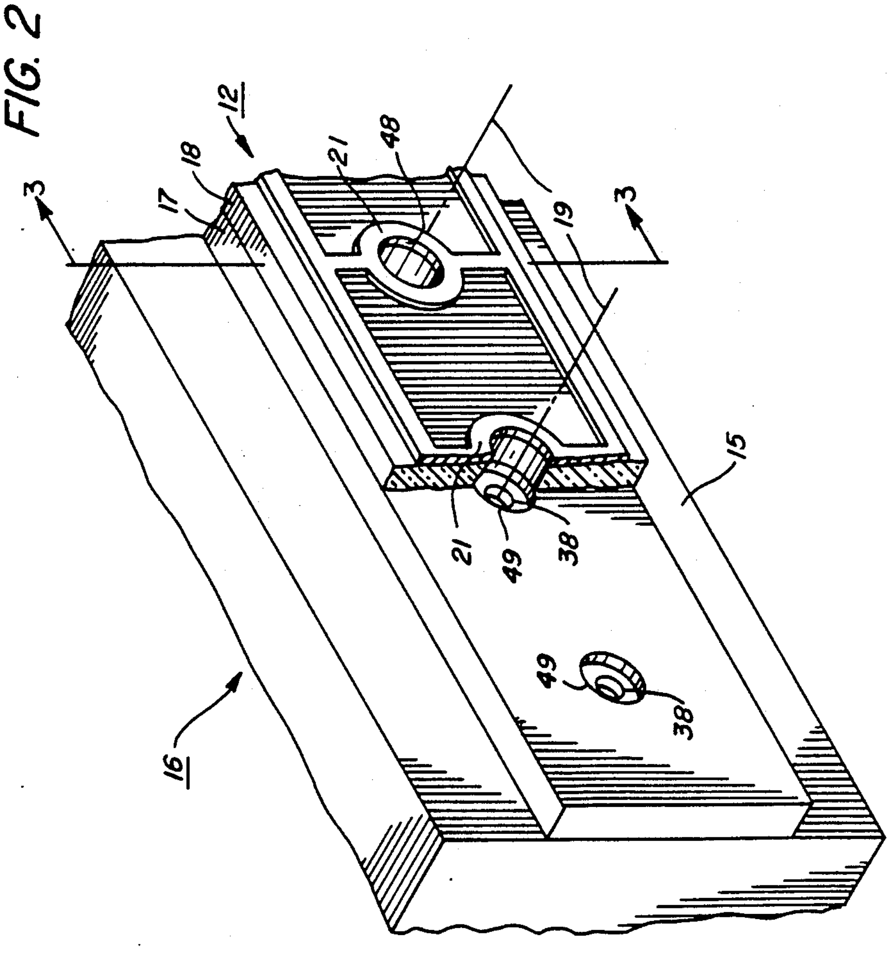
FIG. 2 is an isometric view of a portion of the printhead of the printer of FIG. 1 showing a portion of the integral nozzle plate and EHD electrodes partially sectioned.

In FIG. 2, an enlarged isometric view of a portion of the integral nozzle plate assembly 12 is shown fastened or bonded to the manifold 15 with streams 19 of pressurized ink depicted as dashed lines flowing through nozzles 38 thereof. The integral nozzle plate assembly comprises three elements; namely, a uniformly thick layer of dielectric material 18 having formed on opposite sides thereof a nozzle plate 17 and a set of EHD electrodes 21, one electrode for each nozzle. The dielectric material electrically isolates and spaces the EHD electrodes from the nozzle plate. A portion of the dielectric material and a portion of the EHD electrodes are removed to show the nozzles in the nozzle plate 17 more clearly. FIG. 3 is a cross sectional view of the integral nozzle plate assembly as viewed along the view line identified as 3—3 in FIG. 2.

In a pagewidth printing configuration, the integral nozzle plate assembly 12 has at least one row of nozzles 38 which extend substantially across the width of the recording medium. The droplet generator is held stationary and the recording medium 31, see FIG. 1, is continually moved therepast during the printing operation. The row or rows of nozzles are substantially perpendicular to the direction of movement of the recording medium. Passageways 48 perpendicularly penetrate the dielectric material. These passageways are coaxially aligned with the nozzles 38 and have a larger internal diameter than the nozzles. The EHD electrodes surround the passageways of the dielectric material having about the same internal diameter. In the preferred embodiment, each integral nozzle plate assembly have 116 nozzles with each nozzle having a diameter of about 25 microns and has a nozzle spacing of about 107 mils or 2.7 millimeters center to center. The internal diameter of the passageways 48 and the internal diameter of the EHD electrodes 21 are around 3 to 5 mils, or 75 to 125 microns.

In all continuous stream ink jet printers, the pressurized ink is forced out of the nozzles in ink streams and these streams must have an accurately predetermined diameter. In the electrohydrodynamically (EHD) stimulated ink jet configurations, the free surface of the ink streams are acted upon by electrical fields from biased electrodes 21. The electrodes are placed close to the nozzles; the EHD electrodes must have an accurately predetermined size; and its position in respect to the nozzle must be defined with high precision. The precision requirements for medium and high resolution ink jet printers are such that they cannot be achieved by conventional fabrication methods. The most critical geometrical parameters of the EHD electrode stimulated ink streams are nozzle diameter, nozzle contour, electrode diameter, electrode thickness, distance from the nozzle to the electrode, and concentricity between the nozzle and the electrode. In the case that the nozzle or the electrode have a shape different from the axially symmetrical shape of the preferred embodiment, a similar set of parameters apply. In addition, the EHD electrodes, which are biased to a time varying voltage, must be electrically insulated from the ink and if the nozzle plate is made of a conductive material, as in the present invention, then from the nozzles as well. To maintain the critical geometrical parameter, the prior art devices generally teach fabricating a separate electrode plate and a separate nozzle plate, each fabricated to the necessary precise dimensions, and then bonding the two parts together in precise alignment. This is a difficult and costly manufacturing process step.

In the preferred embodiment, a plurality of linear sets of jet nozzles are electroformed on one side of a sheet of solid dielectric material, such as glass or fluoro polymer. In precise registration with the nozzles, the plurality of electrodes for each set of nozzles is electroformed on the other side of the sheet of solid dielectric. The solid dielectric has a thickness from the range $5\times10^{-5}$ meters to $5\times10^{-4}$ meters or 50 to 500 microns. The solid dielectric is removed from the vicinity of the nozzles and electrodes after the nozzles and electrodes have been partly or completely electroformed, by using the electrodes or the electrodes and the nozzles as masks for removal of the dielectric. The integral nozzle plate assembly is then attached to the manifold 15 by means such as bonding. Alternatively, high precision photolithography is used to provide the starting pattern for the electroforming process, whereby the registration between the features on opposing sides of the dielectric sheet is achieved no worse than to $2.5\times10^{-6}$ meters or 2.5 microns.

The low mechanical stress overgrowth type nickel electroforming may be used for forming the nozzle plate 17 and for building the nozzles 38 in a process analogous to the photolithographic process described in U.S. Pat. No. 4,184,925 to Kenworthy. Thus, as shown in FIGS. 2 and 3, each nozzle plate has a series of nozzles 38 and each nozzle has a respectively shallow recess 49. Pegs (not shown) are formed of a thin photoresist material about 75 microns in diameter, 0.15 microns thick, and 2.7 millimeters center to center. These pegs are readily removed later. During the nickel electroplating process, the nozzle plate reaches and plates above the tops of the pegs. The plating begins to creep inwardly across the top edges of the peg since the nickel around the edges of the pegs is conductive inducing plating in the radial direction across the tops of the pegs as well as in the outward direction from the dielectric material. The plating is continued until the openings over the pegs have been closed by the nickel material to the exact diameter desired for nozzles 38 in the nozzle plate 17 which in the preferred embodiment is about 25 microns. The EHD electrodes may also optionally be nickel. In this case, the opposite side of the dielectric material is photolithographically patterned with a photoresist which may be readily removed after the electrodes have reached the desired thickness of one to two mils or 25 to 50 microns.

If the dielectric sheet is glass, as it is in the preferred embodiment, it is removed from the proximity of the electrodes and the nozzles by etching using the electroformed features such as an etching mask. An example of a glass sheet is Micro-Sheet glass (0211 glass) supplied by Corning Glass Works of Corning, N.Y. In an alternate embodiment, a fluoro polymer may be used. The fluoro polymer is removed from the proximity of the electrode and nozzle by directing a high intensity, oversized laser beam on to the integral nozzle plate assembly 12 from the side of the electrodes 21, thereby evaporating the polymer in the proximity of each electrode and associated nozzle while using the electrode as a shadow mask. Specific examples of the fluoro polymer that may be used are selected from the group of fluorinated ethylene propylene (Teflon® FEP) and tetrafluoroethylene-perfluoro (propyl vinyl ether) copolymer (Teflon® PFA), all supplied by E. I. duPont de Nemours & Co. Optionally, the electroformed features of the electrodes and nozzle plate are coated with a thin layer of a different metal with a high reflectivity for the laser radiation before the removal of the polymer by the laser. In the preferred embodiment, the shallow nozzle recess 49 has the same internal diameter as that of the passageways through the dielectric material.

In electrohydrodynamic stimulation of continuous stream ink jet printers, it is well known that an electrode is placed in the proximity of the ink stream a short distance downstream from the nozzle. This electrode is biased by time varying voltage in respect to the ink stream and hence it has to be electrically insulated from the ink by a dielectric spacer. The distance from the nozzle to the electrode is defined by this spacer. Such a spacer has to function as an insulator in a hostile environment, being exposed to ink vapor, ink mist, and ink contamination during startup and shutdown of the ink jet printer. It has been observed in prior art devices that the resistance between the ink stream and the electrode was too low for successful drop generation. Also, it shorted with a long recovery period after startup, and it was time dependent with the streams running. The cause of these problems was that the ink was wetting the dielectric spacer. Dielectric spacer surfaces generally contain microasperities that cause the wetting even though the spacer material was non-wettable by the ink. In order to achieve a successful and stable EHD stimulation of synchronous continuous ink streams, the surface of the spacer must be coated with a smooth material or coating that is not wettable by the ink.

In the preferred embodiment a coating non-wettable by the ink was prepared containing a mixture of paraffin with ethylene-vinyl acetate copolymer, dissolved in a light aliphatic hydrocarbon, which preferably is VMP naphtha. Although several mixing ratios and concentrations work well, the preferred formulation was a ratio of paraffin to copolymer of 2.8:1 by weight and the ratio of the solids to liquids in the solution was 0.1:1 by weight. The paraffin was Histowax Granular, supplied by Matheson Coleman and Bell, having a melting point 60 to 62 degrees centigrade. The copolymer was ethylene/vinyl acetate with vinyl acetate content of 40 percent and is supplied by Aldrich Chemical Company. In other examples, coating of Fluorad FC721, L6674, and FC10, all trademarks of and marketed by the 3M Company may be successfully used.

Prior to the application of the coating to the surface of the dielectric passageways, the integral nozzle plate assembly 12 is bonded to the manifold 15 to complete the droplet generator, with the nozzle plate 17 receiving the adhesive material around the outer surface regions. This prevents the adhesive material from entering the nozzles when the integral nozzle plate assembly is adhesively attached. In the preferred embodiment, an intermediate structure (not shown) is sealingly bolted to the manifold. The integral nozzle plate assembly 12 is bonded to this intermediate structure. As will be appreciated later, this intermediate structure with bonded integral nozzle plate assembly is easier handled during the coating process for the dielectric spacer passageways 49. Means such as tape applied over the intermediate structure bolt holes and seal interfaces prevent these protected areas from receiving a coating. In an alternate embodiment, the bonding surface of the integral nozzle plate assembly could be protected from coating by means such as removal tape (not shown), so that it can be bonded to the manifold later. The applications of the coatings may be started by dipping the integral nozzle plate assembly or the intermediate structure with the integral nozzle plate assembly bonded thereto into the coating solution followed by drying at room temperature or preferably at an elevated temperature. If the integral nozzle plate assembly has been bonded to the manifold, only the portion of the manifold with the integral nozzle plate assembly is dipped into the coating solution. Optionally, the start of the application of coating may be done at an elevated temperature above that required to maintain the coating material as a liquid or melt. To increase the wetting of the dielectric spacer by the coating, ultrasonic agitation may be applied to the coating containing the integral nozzle plate assembly, with the coating being in the form of solution or melt. After the dip coating and drying of the integral nozzle plate assembly, the nozzles and passageways in the dielectric spacer may be obstructed by the coating material. To prevent this, the nozzles and the passageways and electrodes were cleaned by heating the integral nozzle plate assembly to a temperature above the melting point of the coating and applying a forward pressure difference to it; that is, by applying pressurized air to the upstream side of the internal nozzle plate assembly 12. The range of pressure differences used may be 10–60 psi, but the preferred embodiment, a range of 50–60 psi was used. Alternatively, reverse air pressure may be applied as a second step to clean the electrodes and nozzles even further and prevent a coating buildup in the nozzle recess 49. By reverse air pressure it is meant that the air pressure is applied a second time to the downstream side of the integral nozzle plate assembly. In one alternate example of clearing the nozzles, passageways and electrodes of accumulated coating, a solvent was forced by pressure through the integral nozzle plate assembly in the same manner that ink streams would flow during a printing operation. In another example, the coating step and a cleaning step were combined into one operation. In still another example, the cleaning of the integral nozzle plate assembly after the coating process step, is accomplished by forcing through the integral nozzle plate assembly a fluid non-miscible with the material of the coating at elevated temperature. The fluid may be a liquid or a gas.

In summary, this case relates to an improved electrohydrodynamic (EHD) stimulated ink jet printing device and a method of manufacturing. This improved device eliminates the prior art problem of ink wetting the dielectric spacer between the stimulating electrode and the faces of the jet nozzles. The nozzles are electroformed on one side of a sheet of dielectic material and the EHD electrodes are electroformed on the other side in registration with the nozzles. The dielectric material is removed from the nozzles by using either the nozzles or the electrodes as masks. Next, the internal surface of the dielectric materials (i.e., spacer) is coated with one of a number of coatings which prevent wetting of the spacer by the ink.

Although the foregoing illustrates the preferred embodiment of the present invention and some alternative coating solutions, other variations are possible. All such variations as will be obvious to one skilled in the art are intended to be included within the scope of this invention as defined by the following claims.

I claim:

1. In a continuous stream-type pagewidth ink jet printer of the type having a manifold with a nozzle plate containing a plurality of nozzles from which ink streams are emitted under pressure, the ink streams being stimulated by electrohydrodynamic electrodes provided integrally with but dielectrically spaced from the nozzle plate in an integral nozzle plate assembly attached to said manifold, said integral nozzle plate assembly comprising:

a sheet of dielectric material having a uniform thickness and a linear row of passageways perpendicularly penetrating the dielectric sheet;

an electroformed nozzle plate with a linear row of nozzles contigous with one side of the dielectric sheet, the nozzles being coaxial with the dielectric sheet passageways, the nozzles having a smaller cross-sectional area than that of the passageways in the dielectric sheet;

a plurality of electrodes formed on the side of the dielectric sheet opposite the side contiguous with the nozzle plate, each electrode surrounding a one of the passageways;

means to address the electrodes with a time varying voltage to stimulate each ink stream electrohydrodynamically, so that the ink stream breaks up into droplets a fixed distance from the nozzles; and each internal surface of the passageway of the dielectric sheet having a coating that smooths said passageway surfaces and that is non-wettable by the ink.

2. The integral nozzle plate assembly of claim 1, wherein the nozzles and dielectric sheet passageways have circular cross-sections that are co-axially aligned, the dielectric sheet passageways being larger than the nozzles.

3. The integral nozzle plate assembly of claim 2, wherein the material of both the nozzle plate and the electrode is nickel.

4. The integral nozzle plate assembly of claim 3, wherein the dielectric sheet is glass.

5. The integral nozzle plate assembly of claim 3, wherein the dielectric sheet is a fluoro polymer.

6. The integral nozzle plate assembly of claim 3, wherein the coating is a mixture of paraffin with ethylene-vinyl-acetate copolymer dissolved in a light aliphatic hydrocarbon.

7. The integral nozzle plate assembly of claim 6, wherein the coating formulation has a ratio of paraffin to copolymer of 2.8 to 1 by weight and a ratio of solids to liquids of 0.1 to 1 by weight; and wherein the aliphatic hydrocarbon is VMP naphtha.

8. The method for fabricating an integral nozzle plate assembly for use in an EHD stimulated, continuous stream type ink jet printer, the integral nozzle plate assembly containing a plurality of nozzles through which ink flows in streams from a pressurized ink supply contained in the printer, the method comprising the steps of:

(a) electroforming a nozzle plate on one side of a sheet of dielectric material having a uniform, predetermined thickness, the nozzle plate having a linear row of equally spaced circular nozzles therethrough, each nozzle having an axis perpendicular to the dielectric sheet;

(b) forming a plurality of electrodes on the side of the dielectric sheet opposite the one with the nozzle plate having a predetermined thickness, one electrode being provided for each nozzle, each electrode circularly surrounding the axis of its associated nozzle and being coaxially aligned therewith, the internal cross-sectional area of each electrode being larger than the cross-sectional area of its associated nozzle;

(c) removing the dielectric sheet of material between the electrodes and the nozzle plate using the electrodes as masks to form circular passageways therethrough, the passageways of the dielectric sheet having the same cross-sectional area as that of the electrodes; and (d) coating the internal surface of the dielectric sheet passageways with a coating that is non-wettable by the ink in order to provide a smooth surface for the dielectric sheet passageways.

9. The method of fabricating the integral nozzle plate assembly of claim 8 wherein step (d) further comprises:

(e) preparing a mixture of paraffin with ethylene-vinyl acetate copolymer and dissolving the mixture in a light aliphatic hydrocarbon to form a liquid coating material;

(f) dipping the integral nozzle plate assembly into said liquid coating material;

(g) solidifying the coating material on the integral nozzle plate assembly; and (h) removing the solidified coating material that may block the nozzles and passageways in the dielectric sheet.

10. The method of fabricating the integral nozzle plate assembly of claim 9, wherein the method further comprises the step of removably covering the surface regions of the nozzle plate which are to be subsequently bonded to an ink supplying manifold prior to step (f).

11. The method of fabricating the integral nozzle plate assembly of claim 9, wherein the dielectric sheet is glass, and wherein step (c) is accomplished by etching.

12. The method of fabricating the integral nozzle plate assembly of claim 9, wherein the dielectric material is a fluoro polymer, and wherein step (c) is accomplished directing a high intensity laser beam on the fluoro polymer using the electrodes as a mask to form the passageways in the fluoro polymer by evaporation.

* * * * *